US009491763B2

(12) United States Patent
Dribinski et al.

(10) Patent No.: US 9,491,763 B2
(45) Date of Patent: Nov. 8, 2016

(54) METHODS AND SYSTEMS OF ADJUSTING ANTENNA ELECTRICAL TILT

(71) Applicant: Cellwize Wireless Technologies Ltd., Tel Aviv (IL)

(72) Inventors: Daniel Dribinski, Rishon-Lezion (IL); Sasi Geva, Ein Vered (IL)

(73) Assignee: Cellwize Wireless Technologies Ltd., Tel Aviv (IL)

( * ) Notice: Subject to any disclaimer, the term of this patent is extended or adjusted under 35 U.S.C. 154(b) by 119 days.

(21) Appl. No.: 14/534,455

(22) Filed: Nov. 6, 2014

(65) Prior Publication Data

US 2015/0126173 A1  May 7, 2015

Related U.S. Application Data

(60) Provisional application No. 61/901,056, filed on Nov. 7, 2013.

(51) Int. Cl.
*H04W 72/04* (2009.01)
*H04W 24/02* (2009.01)
*H04W 72/08* (2009.01)
(Continued)

(52) U.S. Cl.
CPC ........... *H04W 72/046* (2013.01); *H01Q 1/246* (2013.01); *H01Q 3/00* (2013.01); *H04W 24/02* (2013.01)

(58) Field of Classification Search
CPC ....... H01Q 1/246; H01Q 3/00; H04W 24/02; H04W 72/046
See application file for complete search history.

(56) References Cited

U.S. PATENT DOCUMENTS

| 8,831,684 | B2 * | 9/2014 | Kenington | ........... | H04B 7/0617 |
| | | | | | 367/138 |
| 2009/0197634 | A1 * | 8/2009 | Sun | ........................ | H01Q 1/246 |
| | | | | | 455/524 |
| 2012/0083232 | A1 * | 4/2012 | Kenington | ............. | H04B 7/086 |
| | | | | | 455/226.1 |

(Continued)

FOREIGN PATENT DOCUMENTS

WO  9917576  4/1999

OTHER PUBLICATIONS

Du, L., Bigham, J., Cuthbert, L., Parini, C., Nahi, P., "Using dynamic sector antenna tilting control for load balancing in cellular mobile communications". In International Conference on Telecommunications, ICT2002, Beijing (vol. 2, pp. 344-348, Jun. 2002).

(Continued)

*Primary Examiner* — Liton Miah
(74) *Attorney, Agent, or Firm* — Wiggin and Dana LLP; Gregory S. Rosenblatt; Jonathan D. Hall

(57) ABSTRACT

There is provided a computer-implemented method for selecting an electrical tilt angle for at least one cellular antenna comprising: receiving at least one parameter indicative of mobile client resource use associated with at least one cellular antenna, the at least one cellular antenna being part of a plurality of antennas arranged in at least one cluster as part of a cellular network; and iteratively adjusting an electrical tilt angle of the at least one antenna so that the at least one parameter indicative of client resource use is maintained within at least one predefined threshold, thereby providing users of the mobile clients of the at least one cellular antenna with at least a level of service within the at least one predefined threshold.

22 Claims, 14 Drawing Sheets

302

(51) Int. Cl.
  *H01Q 3/00* (2006.01)
  *H01Q 1/24* (2006.01)

(56) References Cited

U.S. PATENT DOCUMENTS

2013/0156045 A1* 6/2013 Hu .................. H04L 12/403
  370/449
2014/0135026 A1* 5/2014 Hamada .............. H04W 24/02
  455/452.1

OTHER PUBLICATIONS

Bahar Partov, Douglas J. Leith, Rouzbeh Razavi, "Utility Fair Optimisation of Antenna Tilt Angles in LTE Networks". Hamilton Institute, NUI Maynooth, Bell Laboratories, Alcatel-Lucent, Dublin, Oct. 3, 2013.
Niemelä, J., Isotalo, T., & Lempiäinen, J., "Optimum antenna downtilt angles for macrocellular WCDMA network". EURASIP Journal on Wireless Communications and Networking, 2005(5), pp. 816-827.
Ismail, Muhammad Aatiq; Xu, Xiang; Mathar, Rudolf, "Autonomous antenna tilt and power configuration based on CQI for LTE cellular networks," Wireless Communication Systems (ISWCS 2013), Proceedings of the Tenth International Symposium on , vol., no., pp. 1,5, Aug. 27-30, 2013.
Bratu, V. I., "Self-optimization of Antenna Tilt in Mobile Networks". KTH School of Information and Communications Technology and Radio Communication Systems, TRITA-ICT-EX-2012:200, (Jun. 2012).
"Antenna Based Self Optimizing Networks for Coverage and Capacity Optimization". Reverb Networks Inc., 2012.
Gebremariam, Anteneh A.; Kifle, Dereje W.; Wegmann, Bernhard; Viering, Ingo; Granelli, Fabrizio, "Techniques of Candidate Cell Selection for Antenna Tilt Adaptation in LTE-Advanced". European Wireless 2014; 20th European Wireless Conference; Proceedings of, vol., no., pp. 1,6, May 14-16, 2014.

* cited by examiner

METHODS AND SYSTEMS OF ADJUSTING ANTENNA ELECTRICAL TILT

CROSS-REFERENCE TO RELATED APPLICATION

The present non-provisional patent application claims the benefit of U.S. provisional patent application No. 61/901,056 filed on Nov. 7, 2013. The entire content of the application is hereby incorporated by reference in its entirety.

FIELD AND TECHNICAL BACKGROUND

The presently disclosed subject matter, in some embodiments thereof, relates to systems and methods of optimizing cellular networks and, more particularly, but not exclusively, to systems and methods for automatic adjustment of an electrical tilt of an antenna that is part of the cellular network.

Traffic on cellular networks is constantly increasing. For example, the emergence of smartphones, tablets and other mobile devices; have created rising demand for internet connectivity.

Pressure to reduce costs and increase return on investment have resulted in a search for better ways to improve the efficiency of currently deployed equipment, or to improve network planning.

Challenges to modern networks include, for example: coverage extension for outdoor environments, coverage extension for indoor environments, reduction of inter-cell interference, and external interference robustness.

Improvements in coverage and reduction in the level of interference in cellular networks may translate into an increased ability of the network to handle higher traffic volume (i.e., voice and data), with less investment in network infrastructure.

One way to improve coverage and reduce interference is by adjusting the electrical tilt of the antennas of the network. One way to select the antenna tilt is based on radio frequency (RF) propagation production for each antenna, then creating traffic maps based on a digital clutter map (DCM). Algorithms for optimal antenna configuration selection may be based on static RF network simulators (e.g., Monte-Carlo based), where different antenna configurations are evaluated using a simulator. Alternatively, adjustments are made manually, by trial and error.

SUMMARY OF THE PRESENTLY DISCLOSED SUBJECT MATTER

An aspect of some embodiments of the presently disclosed subject matter relates to methods and/or systems for automatically selecting an electrical tilt for an antenna according to at least one parameter of the antenna indicative of client resource use. Optionally, coverage to the clients is relatively improved and interference is relatively reduced.

According to an aspect of some embodiments of the presently disclosed subject matter there is provided a computer-implemented method for selecting an electrical tilt angle for at least one antenna, the method being carried out by a tilt angle calculation unit programmed to carry out the steps of the method, which comprise: receiving at least one parameter indicative of mobile client resource use associated with at least one cellular antenna, the at least one cellular antenna being part of a plurality of antennas arranged in at least one cluster as part of a cellular network; and iteratively adjusting an electrical tilt angle of the at least one antenna so that the at least one parameter indicative of client resource use is maintained within at least one predefined threshold, thereby providing users of the mobile clients of the at least one cellular antenna with at least a level of service within the at least one predefined threshold.

According to some embodiments of the presently disclosed subject matter, the at least one parameter indicative of client resource use comprises at least one parameter indicative of interference.

According to some embodiments of the presently disclosed subject matter, the at least one parameter indicative of interference comprises at least one parameter associated with measured Received Total Wideband Power (RTWP). Optionally, the at least one predefined threshold comprises an upper limit for the mean value of the RTWP during a predefined time period.

According to some embodiments of the presently disclosed subject matter, the lower limit of the target coverage cost range is reduced with increased client resource use.

According to some embodiments of the presently disclosed subject matter, the method further comprises monitoring the at least one parameter indicative of client resource use, and re-selecting the electrical tilt angle when the at least one parameter indicative of client resource use is outside of the at least one predefined threshold. Optionally, the predefined range comprises thresholds for a distribution spread over time of the at least one parameter indicative of client resource use.

According to some embodiments of the presently disclosed subject matter, the method further comprises: selecting a target coverage parameter for the at least one antenna according to the at least one parameter indicative of client resource use; calculating a coverage cost for the at least one antenna using an initial electrical tilt angle; and wherein iteratively adjusting further comprises iteratively adjusting the electrical tilt angle according to the calculated coverage cost for the selected tilt angle relative to the target coverage cost parameter. Optionally, the method further comprises: calculating a corresponding interference cost of the at least one antenna using the electrical tilt angle; wherein iteratively adjusting further comprises iteratively adjusting the electrical tilt angle according to the corresponding calculated interference cost relative to the target coverage cost parameter. Optionally, the coverage cost and the interference cost are both calculated using vertical radiation patterns of the at least one antenna. Optionally, the coverage cost comprises a coverage cost function calculated as:

$$Cost_{Coverage} = \sum_{n=1}^{10} \left( G_{\alpha+n-1} \times \frac{1}{n} \right);$$

wherein $G_\alpha$ is the antenna vertical radiation pattern gain for the antenna with electrical angle $\alpha$.

Optionally, the interference cost comprises an interference cost function calculated as:

$$Cost_{Interference} = \Sigma_{n=\alpha}^{\gamma} G_n;$$

wherein $$\gamma = \min_n \left\{ \tan^{-1}\left[ \frac{(H + ASL_2 - ASL_n)}{D_n} \right] + 90 \right\} - 90;$$

and $G_n$ is the antenna vertical radiation pattern gain on angle n, for the antenna with initial angle $\alpha$.

Optionally, the method further comprises calculating the coverage cost and corresponding interference cost in view of the client resource use parameter, for each of the affected antennas within the cluster, so that the electrical tilt angles in the affected antennas are adjusted in response to changes in the tilt angle of the one or more antennas.

According to some embodiments of the presently disclosed subject matter, the electrical tilt angle is calculated according to physical deployment parameters of the at least one antenna, and considering the distance from the antenna to the outer edge of a coverage zone of the antenna along the surface of the earth.

According to some embodiments of the presently disclosed subject matter, an initial setting of the electrical tilt angle is a pre-existing electrical tilt angle setting of the at least one antenna.

According to some embodiments of the presently disclosed subject matter, the method further comprises adding a new antenna to the at least one cluster, and automatically selecting the electrical tilt angle for the new antenna according to the client resource use parameter.

According to some embodiments of the presently disclosed subject matter, the method further comprises removing an existing antenna from the at least one cluster, and automatically selecting new electrical tilt angles for the remaining affected antennas in the cluster, according to the client resource use parameter.

According to an aspect of some embodiments of the presently disclosed subject matter there is provided a system for automatic cellular antenna electrical tilt adjustment comprising: at least one cellular antenna arranged in at least one cluster as part of a cellular network; a computer in electrical communication with the at least one antenna, the computer programmed to receive signals from the at least one antenna and calculate at least one parameter indicative of mobile client resource use associated with the at least one cellular antenna; a hardware processor in electrical communication with the computer and with the at least one antenna; a non-transitory memory having stored thereon program modules for instruction execution by the hardware processor, comprising: a module for iteratively adjusting an electrical tilt angle of the at least one cellular antenna so that the at least one parameter indicative of mobile client resource use is maintained within at least one predefined threshold, thereby providing users of the mobile clients of the at least one cellular antenna with at least a level of service within the at least one predefined threshold.

According to some embodiments of the presently disclosed subject matter, the at least one antenna is coupled to an actuator with remote control capabilities, and the memory further comprises a module for remotely changing the existing electrical tilt angle of the at least one antenna according to the iteratively adjusted electrical tilt angle.

According to some embodiments of the presently disclosed subject matter, the at least one antenna is a sector antenna.

According to some embodiments of the presently disclosed subject matter, the cellular network comprises a Universal Mobile Telecommunications System (UMTS) network or a Long Term Evolution (LTE) network.

According to some embodiments of the presently disclosed subject matter, the system further comprises a computer system programmed to execute program instructions of a self optimizing network (SON) for the cellular network, and wherein the modules are programmed for integration with the SON program.

According to an aspect of some embodiments of the presently disclosed subject matter there is provided a computer program product for automatically selecting an electrical antenna tilt angle, the computer program product comprising: one or more non-transitory computer-readable storage mediums, and program instructions stored on at least one of the one or more storage mediums, the program instructions comprising: program instructions for automatically receiving at least one parameter indicative of client resource use for at least one antenna of a plurality of antennas arranged in at least one cluster as part of a cellular network; program instructions for automatically selecting a target coverage cost range for the at least one antenna according to the at least one parameter indicative of client resource use; program instructions for automatically calculating a coverage cost for the at least one antenna using an initial electrical tilt angle; program instructions for automatically calculating a corresponding interference cost of the at least one antenna using the initial electrical tilt angle; program instructions for automatically selecting an electrical tilt angle for the at least one antenna, by iteratively changing the initial tilt angle, so that the calculated coverage cost for the selected tilt angle is within the target coverage cost range, and so that the corresponding calculated interference cost for the selected electrical tilt angle is at a minimum within the target coverage cost range; and program instructions for automatically changing the existing electrical tilt angle of the at least one antenna according to the selected electrical tilt angle.

Unless otherwise defined, all technical and/or scientific terms used herein have the same meaning as commonly understood by one of ordinary skill in the art to which the presently disclosed subject matter pertains. Although methods and materials similar or equivalent to those described herein can be used in the practice or testing of embodiments of the presently disclosed subject matter, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the presently disclosed subject matter can involve performing or completing selected tasks manually, automatically, or a combination thereof. Moreover, according to actual instrumentation and equipment of embodiments of the method and/or system of the presently disclosed subject matter, several selected tasks could be implemented by hardware, by software or by firmware or by a combination thereof using an operating system.

For example, hardware for performing selected tasks according to embodiments of the presently disclosed subject matter could be implemented as a chip or a circuit. As software, selected tasks according to embodiments of the presently disclosed subject matter could be implemented as a plurality of software instructions being executed by a computer using any suitable operating system. In an exemplary embodiment of the presently disclosed subject matter, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the presently disclosed subject matter are herein described, by way of example only, with reference to the accompanying drawings. With specific reference now to the drawings in detail, it is stressed that the particulars shown are by way of example and for purposes of illustrative discussion of embodiments of the presently disclosed subject matter. In this regard, the description taken with the drawings makes apparent to those skilled in the art how embodiments of the presently disclosed subject matter may be practiced.

In the drawings:

FIG. 1A is a high level flowchart of a computerized method of automatically selecting an electrical antenna tilt angle according to one or more network performance parameters, in accordance with exemplary embodiments of the presently disclosed subject matter;

FIG. 1B is a detailed version of the flowchart of FIG. 1A;

FIG. 2 is a simplified schematic of an exemplary deployed antenna, with depicting tilting angles in accordance with some embodiments of the presently disclosed subject matter;

FIG. 3 is a correlation of distances along the ground from the antenna to the antenna azimuth angles measured from a horizontal line parallel to the distance along the ground, in accordance with some embodiments of the presently disclosed subject matter;

FIG. 4 is an exemplary vertical cellular antenna radiation pattern, in accordance with some embodiments of the presently disclosed subject matter;

FIG. 5 is table of gain values for a zero degree tilt pattern and a seven degree tilt pattern, correlated with distance, in accordance with some embodiments of the presently disclosed subject matter;

FIGS. 6A-6B are schematics of a network topology represented by a Voronoi diagram, showing an exemplary target distance calculation, in accordance with some embodiments of the presently disclosed subject matter;

FIG. 7 is a schematic diagram to help calculate an initial electrical tilt angle of an antenna, in accordance with some embodiments of the presently disclosed subject matter;

FIG. 8 is an exemplary schematic representing Terrain Height Profile (THP) data retrieved from Google Earth, in accordance with some embodiments of the presently disclosed subject matter;

FIG. 9 is the schematic diagram of FIG. 7, with a coverage area and associated end angle, in accordance with some embodiments of the presently disclosed subject matter;

FIG. 10 is the schematic diagram of FIG. 7, with an interference area and associated end angle, in accordance with some embodiments of the presently disclosed subject matter;

Figure 11:
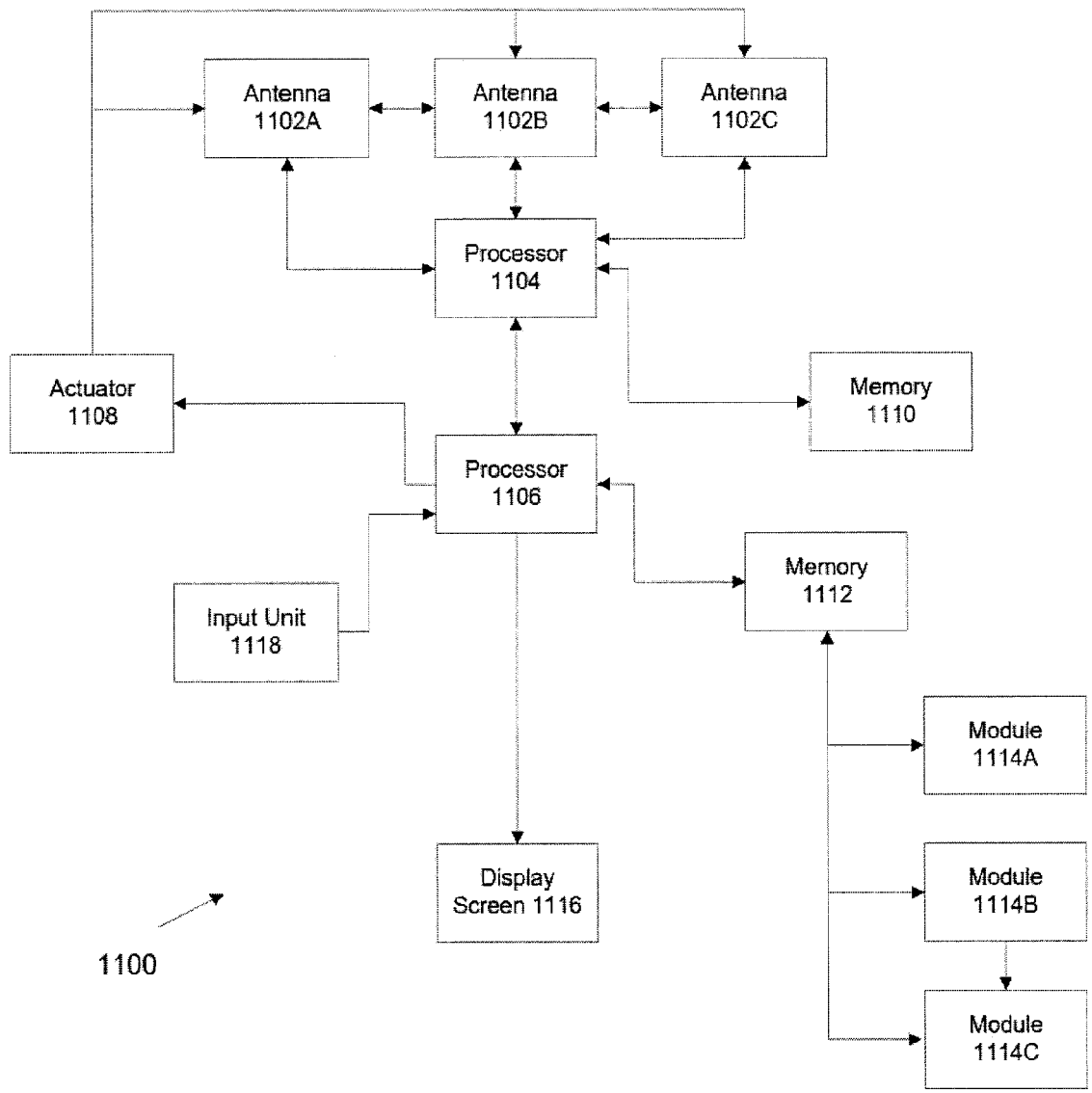
Figure 12:
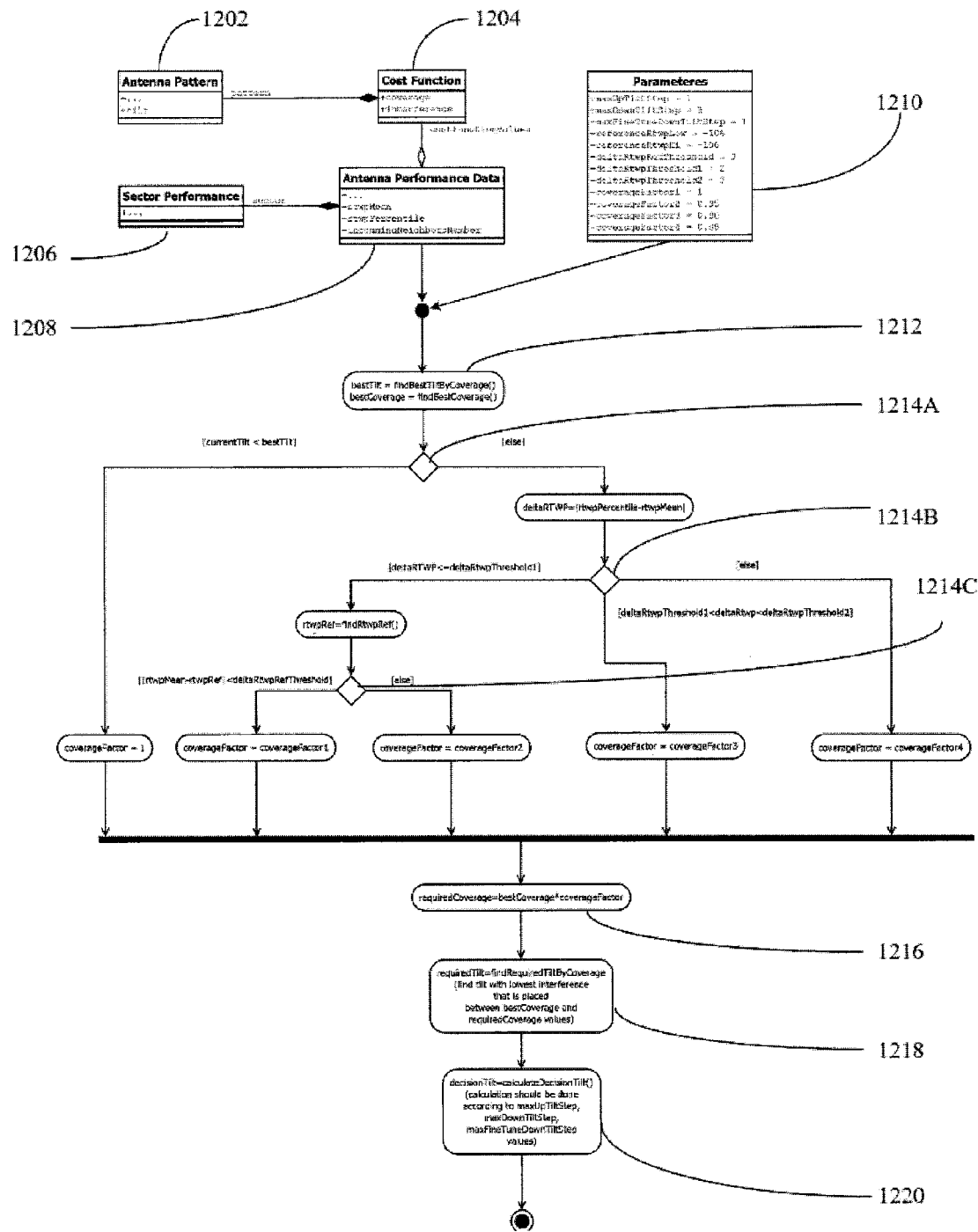

FIG. 11 is a block diagram of an exemplary system for automatically selecting an electrical antenna tilt angle, in accordance with exemplary embodiments of the presently disclosed subject matter; and FIG. 12 is a flowchart of an exemplary method of implementing the method of FIG. 1 and/or for execution by the system of FIG. 11, in accordance with some embodiments of the presently disclosed subject matter.

DETAILED DESCRIPTION

The presently disclosed subject matter, in some embodiments thereof, relates to systems and methods of optimizing cellular networks and, more particularly, but not exclusively, to systems and methods for automatic adjustment of an electrical tilt of an antenna that is part of the cellular network.

An aspect of some embodiments of the presently disclosed subject matter relates to methods and/or systems for automatically selecting and/or adjusting an electrical tilt for a cellular antenna according to a measured cellular network performance parameter of client resource use which is associated with the electrical tilt angle of the antenna. In such a manner, client use of the radiofrequency spectrum of the antenna is used as feedback to adjust the electrical tilt angle of the antenna, assuring that clients are provided with a level of service quality. Optionally, the electrical tilt angle is iteratively adjusted so that the measured parameter indicative of client resource use is maintained within at least one predefined threshold defined for a level of service, to help ensure the clients with a define quality of service.

The antenna may operate within a predefined frequency spectrum, and/or the energy transmitted by the antenna may be limited (e.g., by laws and/or regulations), which may limit the number of users per antenna and/or the download and/or upload bandwidth that may be allocated to each user. The limited resources may become strained by client resource use, for example, if many clients all decide to download and/or upload large amounts of data at the same time. The network traffic congestion may reduce the quality of service to the clients, for example, by sudden disconnections of existing data transfer sessions and/or preventing initiation of new data transfer sessions. The network congestion may also similarly affect the quality of service of voice telephone calls.

The clients are mobile users of the cellular network, for example, smartphones, tablet computers, laptop computers with cellular connections, or other mobile devices. Mobile clients may use the cellular network for wireless data transfer, for example, to and/or from the internet.

The electrical tilt angle of the antenna may be measured relative to a horizontal plane perpendicular to the antenna and/or parallel to the ground. An increase in the electrical tilt angle is a downtilt of the antenna relative to the horizontal plane. The electrical tilt angle may be changed by adjusting the characteristics of signal phases between the antenna elements. The electrical tilt adjustment may uniformly affect the signal of the antenna, for example, the signal is uniformly tilted downwards. This may be compared to an adjustment of the mechanical tilt, in which part of the signal is downtilted and part of the signal is correspondingly uptilted. Optionally, coverage provided to the mobile clients is relatively improved by the antenna as the tilt angle is increased. Tilting the antenna downwards may relatively increase the antenna gain available to the mobile clients in proximity to the antenna. Alternatively or additionally, interference is relatively reduced by the antenna, as the tilt angle is increased. Tilting the antenna downwards may relatively decrease the antenna gain outside of the coverage area, which may reduce external interference. In exemplary embodiments, the antenna electrical tilt angle is iteratively changed according to the measured actual network performance parameter. Optionally, performance feedback of the antenna having the adjusted electrical tilt angle iteratively improves coverage and/or reduces interference.

Interference may be caused, for example, between several mobile clients that are trying to transfer large amounts of data at the same time, beyond the ability of the antenna to handle the simultaneous data transfer. Interference may also be cause by signals produces from devices that are not mobile clients associated with the antenna, for example, by mobile device clients of other cellular networks in proximity to the antenna, by mobile devices associated with neighboring antennas, and/or background environmental noise. Interference may reduce the amount of bandwidth available to the mobile clients associated with the antenna.

Optionally, the measured parameter is indicative of current network behavior, for example, the number of mobile users associated with the antenna and/or the amount of data the users are uploading and/or downloading. Alternatively or additionally, the measured parameter is indicative of network interference due to the client resource use, for example, if the data resources are being strained by the behavior of the users.

Optionally, a target coverage value is selected according to the level of measured interference. Optionally, the target coverage is a range. Optionally, a relatively lower limit of the coverage range is correlated with a relatively higher level of interference. Optionally, the tilt angle is selected so that an associated calculated cost falls within the coverage range. Optionally, the tilt angle is selected so that an associated calculated interference cost is at a relative minimum for the related calculated cost within the coverage range. Optionally, the tilt angle is iteratively adjusted to identify a tilt angle with the associated cost within the target range. Optionally, the tilt angle is dynamically adjusted in response to dynamic network resource use.

Optionally, the method is performed for several antennas of a cluster at about the same time, so that the tilt angles of the antennas are adjusted approximately together (e.g., within several seconds or minutes of each other). Optionally, the method is performed for all the antennas in the cellular network at about the same time, so that the entire network is adjusted together.

Optionally, the method is performed on deployed and/or operating antennas forming a cellular network.

Optionally, the interference parameter is a Received Total Wideband Power (RTWP). RTWP may represent the total level of noise within the cellular network frequency band of a cell. RTWP may be indicative of the number and/or frequency of dropped calls. RTWP may be indicative of performance degradation of internet file downloading and/or uploading. Optionally, the at least one predefined threshold of the interference parameter is an upper limit for the mean value of the RTWP during a predefined time period.

Before explaining at least one embodiment of the presently disclosed subject matter in detail, it is to be understood that the presently disclosed subject matter is not necessarily limited in its application to the details of construction and the arrangement of the components and/or methods set forth in the following description and/or illustrated in the drawings and/or the Examples. The presently disclosed subject matter is capable of other embodiments or of being practiced or carried out in various ways.

Figure 1A:
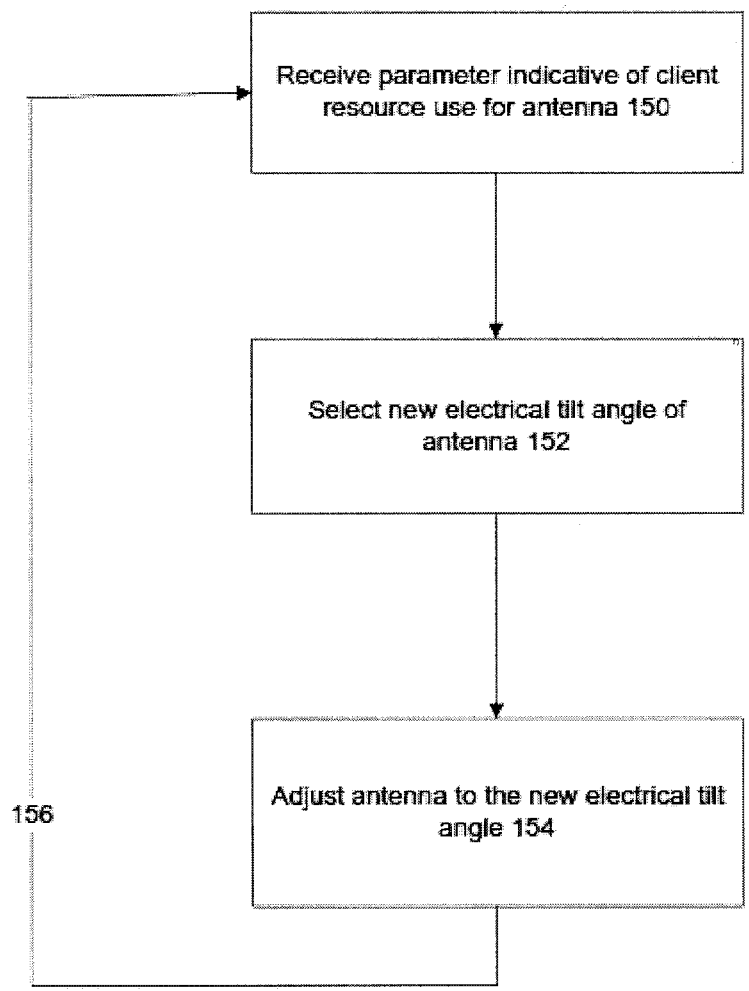

Referring now to the drawings, FIG. 1A is a high level flowchart of a computerized method of automatically selecting and/or adjusting an electrical tilt angle of an antenna according to one or more measured parameters indicative of client resource use of the antenna, according to exemplary embodiments of the presently disclosed subject matter. Additional details are provided below, for example with reference to FIG. 1B. The methods may be performed approximately in parallel for multiple antennas.

Optionally, the method provides for calculation of the optimized electrical tilt angles in a period of time that is short enough to allow a substantially real time response to dynamic mobile client resource use. Optionally, the time period is short enough to allow changes to the electrical tilt to improve the current network performance, for example, within about 1-10 seconds, or about 10-60 seconds, or about 1-10 minutes, or other smaller or larger values. Optionally, the time period is short enough so that the method may be integrated as part of a self optimizing network (SON) system. Optionally, the time period is short for calculating the electrical tilt angles for about 1-1000, or about 1000-10000 antennas.

At 150, a parameter indicative of client resource use for an antenna of a group of antennas arranged in clusters as part of a cellular network is received. For example, a computer monitors the extent of use of the frequency spectrum by mobile clients transferring data. The computer may periodically and/or continuously calculates the parameter so that the degree of network congestion and/or quality of service is quantified.

At 152, a new electrical tilt angle for the antenna is selected by iteratively adjusting the existing angle. Optionally, the parameter indicative of client resource use is maintained within a predefined threshold. Optionally, clients are provided with at least a level of service within the predefined threshold.

For example, the parameter indicative of client resource use is associated with the level of interference for the antenna. The antenna tilt angle may be adjusted so that the interference associated with the antenna is maintained below an acceptable threshold. The mobile clients associated (i.e., connected to) with the antenna may be provided with high quality service, less dropped calls and/or faster internet connectivity rates.

Optionally, at 154, the existing electrical tilt angle of the antenna is changed to the selected electrical tilt angle. Optionally, the changing is performed automatically, for example, by a computer controlling a remote actuator on the antenna according to the selected tilt angle.

At 156, the method is iteratively repeated so that the electrical tilt angle is dynamically adjusted according to client use of the network. Optionally, the dynamic adjustment maintains the quality of service. Alternatively or additionally, the dynamic adjustment improves the quality of service.

Optionally, the parameter of client resource use (block 150) is monitored continuously and/or periodically. Optionally, at 152 a new electrical tilt angle is selected when the parameter falls outside of the threshold. Alternatively, the existing tilt angle is maintained when the parameter falls within the threshold. Optionally, at 154, the antenna is adjusted when the new tilt angle has been selected.

Figure 1B:
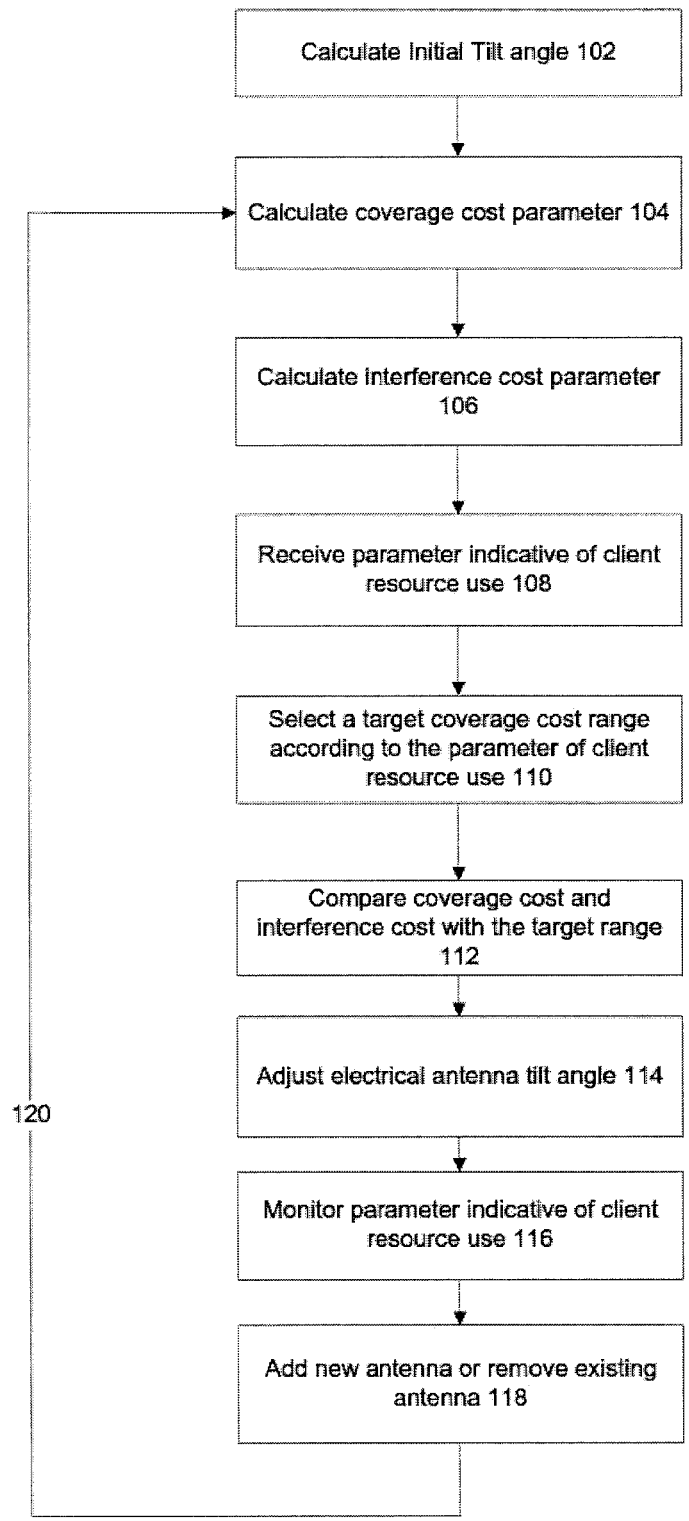

Reference is now made to FIG. 1B, which is a detailed version of the flowchart of FIG. 1A, of a computerized method of automatically selecting an electrical antenna tilt angle according to one or more network performance parameters, in accordance with exemplary embodiments of the presently disclosed subject matter. Optionally, the selected electrical tilt angle relatively improves coverage and/or relatively reduces interference. Optionally, the selected electrical tilt angle maintains and/or relatively improves the network performance parameter.

Optionally, the tilt angle is selected in consideration of a trade-off between coverage and interference. Optionally, the tilt angle is selected to maintain and/or improve the measured network performance parameter in view of the trade-off between coverage and interference. Relatively improving coverage by increasing the coverage area also relatively increases interference, which may degrade the quality of service to clients in the coverage area. Relatively reducing interference, which may increase the quality of service to the clients, may also relatively reduce the coverage area, which may allow fewer clients to receive service.

At 102, an initial electrical antenna tilt angle is received, for example, by accessing a database storing the tilt angles for the antennas. Alternatively or additionally, the initial electrical tilt angle is measured, for example, by reading current antenna settings.

Alternatively, the antenna tilt angle is calculated, for example, using antenna physical deployment parameters as discussed below. Alternatively or additionally, antenna gains associated with the tilt angle are received, measured and/or calculated, for example, as will be described below.

The antenna electrical tilt angle may be calculated from antenna physical deployment parameters and/or surrounding network topology. For example, a geographical site location (e.g., latitude, longitude), a height of deployed antenna above ground level (AGL), an antenna azimuth (direction in a horizontal plan), and/or a mechanical antenna tilt. Exemplary equations for calculating the antenna tilt angle using the deployment parameters are discussed below. The antenna tilt angle may be calculated to be positive (i.e., downtilt) or negative (i.e., uptilt).

Figure 2:
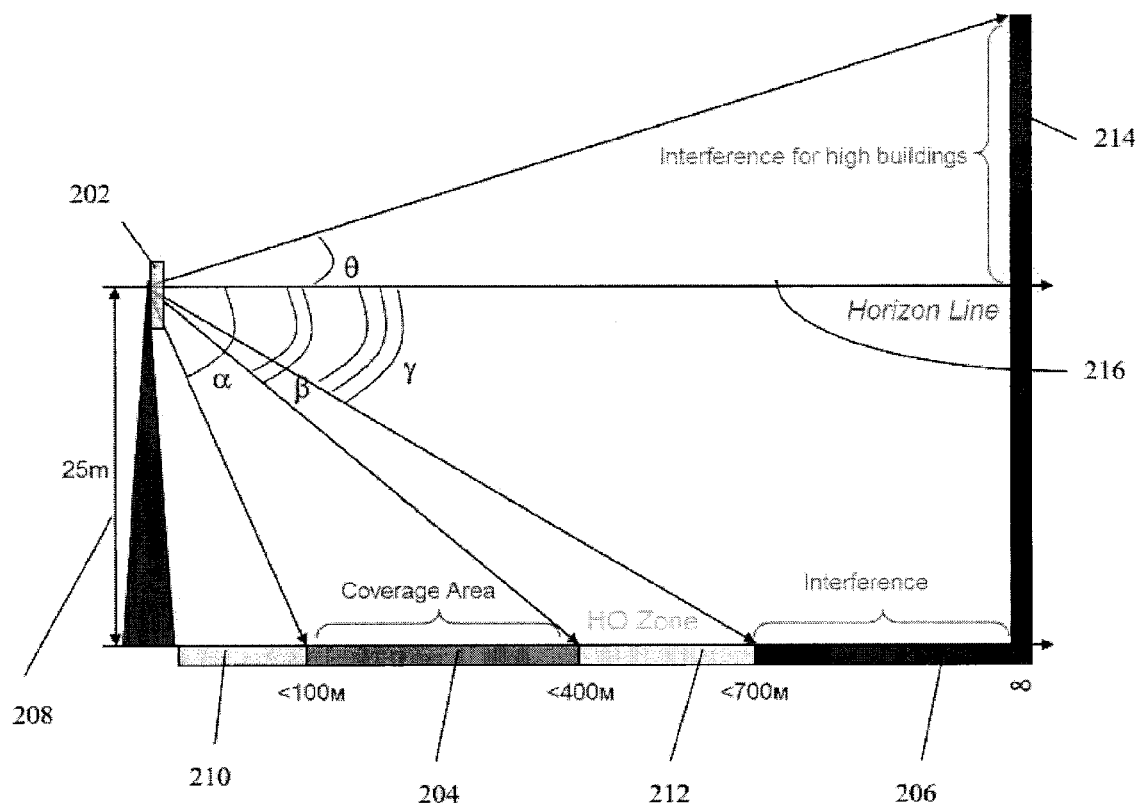

Reference is now made to FIG. 2, which is a simplified schematic of an exemplary deployed cellular antenna 202, with depicting tilting angles in accordance with some embodiments of the presently disclosed subject matter. Antenna 202 may be analyzed with respect to surrounding network topology, for example, antenna 202 is shown as part of a network having distances between antenna sites of about 1000 meters.

Antenna 202 is deployed a height 208 above ground level, for example, about 25 meters as shown.

Antenna 202 may be analyzed in association with a coverage area 204 and/or an interference area 206. Coverage area 204 may require relatively high gain from antenna 202. Coverage area 204 may be located, for example, about 100-400 meters from antenna 202. Interference area 206 may require relatively low gain from antenna 202. Interference area 206 may be located, for example, over about 700 meters from antenna 202.

A handover (HO) zone 212 is the transition area between coverage area 204 and interference area 206. For example, at about 400-700 meters from antenna 202. HO zone 212 may be the transition between antenna 202 and another neighboring antenna that has overlapping coverage. Handovers may occur in HO zone 212.

A region 210 that encompasses the area with horizontal distance less than about 100 meters may not be considered in the selection of the electrical tilt angle. Region 210 may be assumed to have relatively high antenna gain and/or relatively low signal propagation loss, which may compensate for unstable antenna gain. Furthermore, the pattern of antenna constellation requires a distance greater than $10*\lambda$, wherein $\lambda$ is the RF wavelength. For the 900 megahertz (MHz) frequency band, $10*\lambda$ is approximately equal to 30 meters.

A building interference area 214 represents interference of the signal from antenna 202 above a horizontal line 216 due to, for example, a tall building, a hill, or other geographical and/or physical features.

The azimuth of antenna 202 is measured relative to horizontal line 216 (i.e., 0 degrees of tilt).

Angles $\alpha$, $\beta$, $\gamma$, and $\theta$ are measured relative to horizontal line 216. $\alpha$ denotes an angle corresponding to the start of coverage area 204. $\beta$ is the angle corresponding to the end of coverage area 204. $\gamma$ denotes an angle corresponding to the start of interference area 206. $\theta$ denotes an angle corresponding to the top of building area 214.

Figure 3:
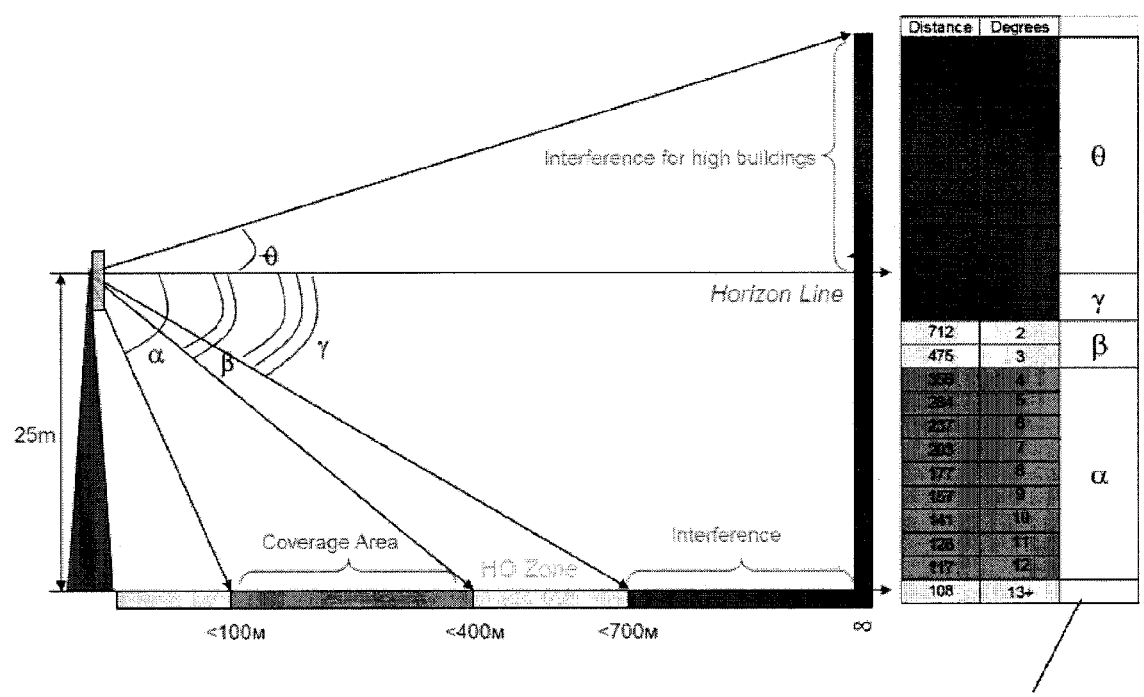

Reference is now made to FIG. 3, which are correlations (e.g., table) 302 of distances measured along the ground from antenna 202 to the angles measured from horizontal line 216 that correspond to the distance along the ground. Correlation values 302 are also correlated with angles $\alpha$, $\beta$, $\gamma$, and/or $\theta$. For reference and clarity, the schematic of FIG. 2 is shown next to table 302.

Optionally, given the distance to reach a target within one of the predefined zones, the corresponding angle may be selected using the correlation values. Alternatively or additionally, given the angle above or below the horizon, the corresponding distance may be selected.

Optionally, a target distance representing a distance between the antenna and the furthest area from the antenna for which adequate coverage is to be provided is calculated. Optionally, the target distance is calculated from a network topology diagram. The diagram may be stored, for example, on a central server, which may allow updates by different network operators. The diagram may be accessed, for example, automatically by software that calculates and/or adjusts the electrical tilt angle. The software may access the network diagram before the calculations, if the diagram has been updated since the last access.

Optionally, the target distance is calculated per coverage sector of the cellular network. Optionally, the target distance is calculated per sector antenna.

Optionally, the target distance is used in the calculation of the coverage cost parameter, for example, as discussed below.

Figure 6A:
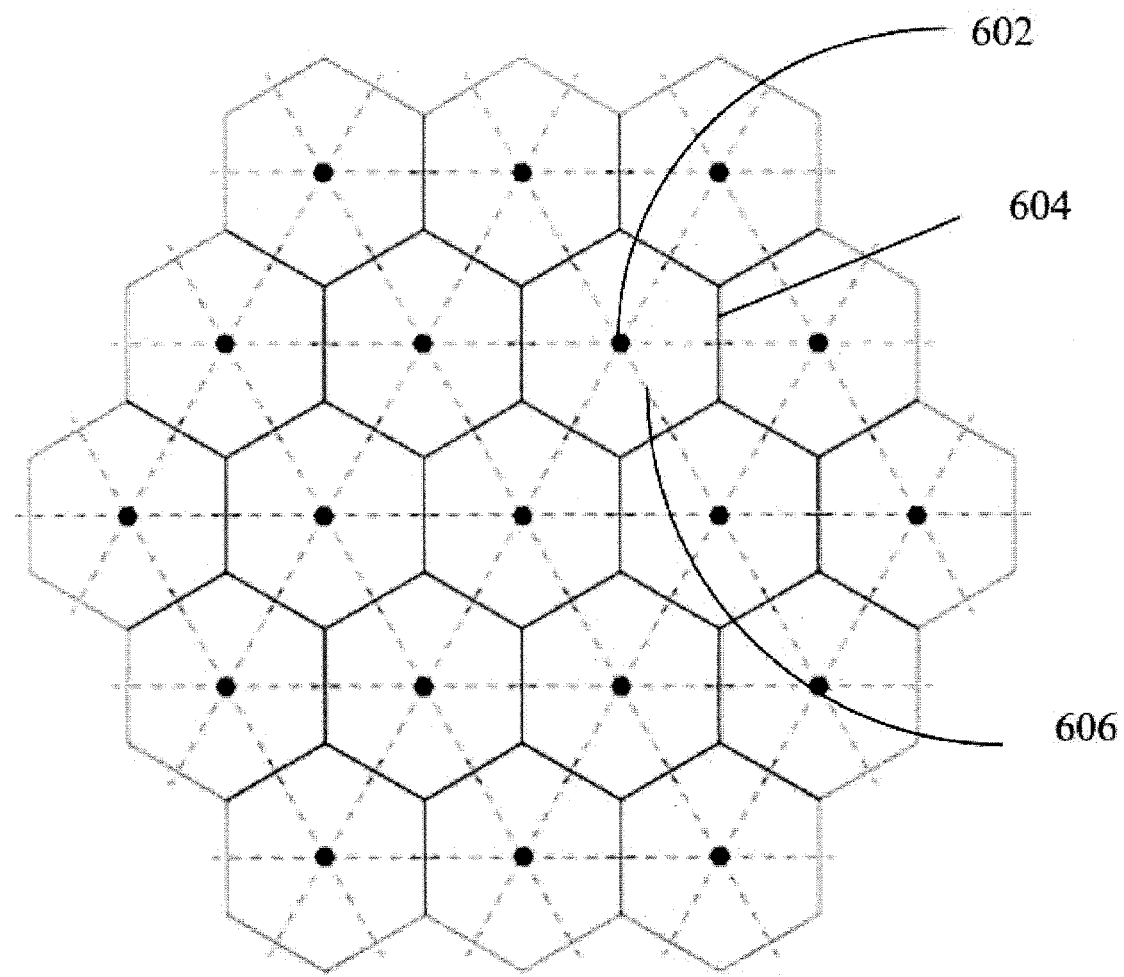

Reference is now made to FIG. 6A, which is a schematic of a network topology diagram represented by a Voronoi diagram and/or Delaunay Triangulation, according to some embodiments of the presently disclosed subject matter. Antennas are located at an approximately central site 602 within a coverage cell 604. Optionally, antennas are sector antennas with coverage represented within dotted lines 606.

Figure 6B:
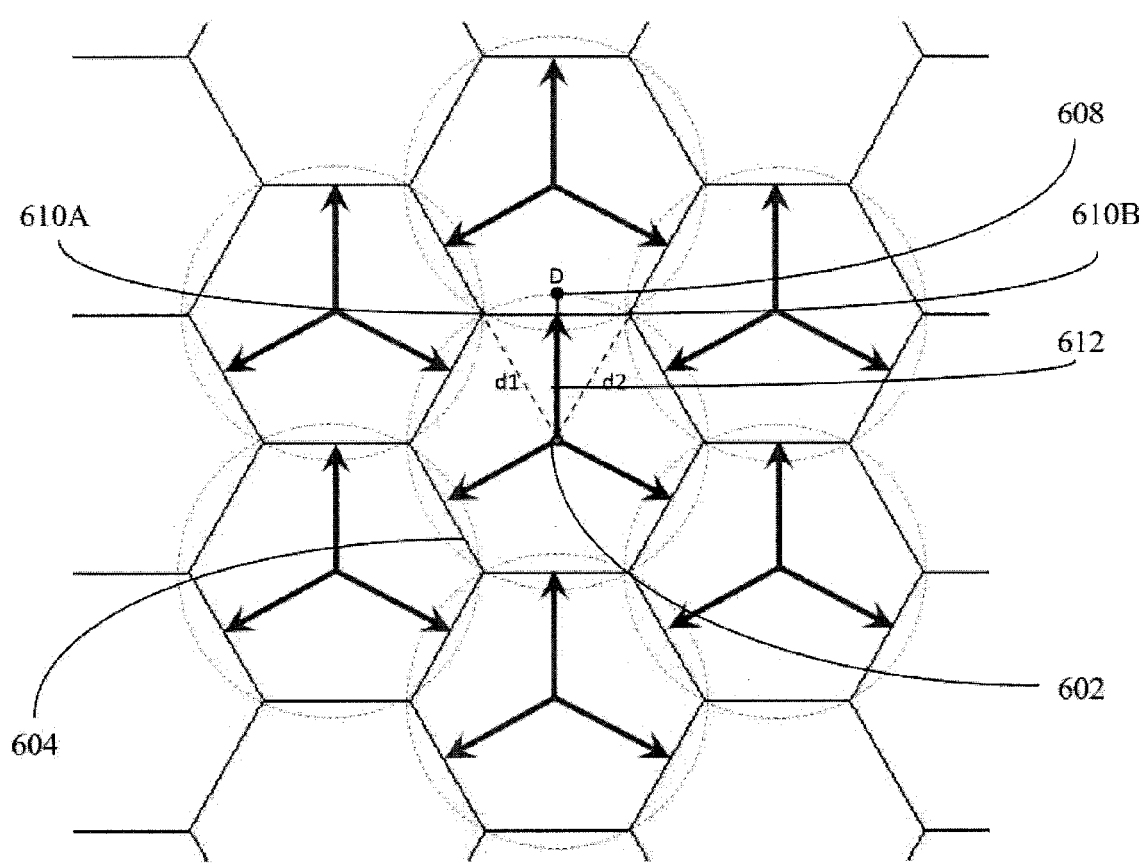

FIG. 6B is a blow up of a portion of the diagram of FIG. 6A, showing a sample calculation of a target distance 608.

$$\text{Target distance } 608(D) = (d1+d2)/2.$$

Where: d1 is the distance between site 602 and the first left corner 610A of cell 604 of the Voronoi diagram from a sector azimuth 612.

Where: d2 is the distance between site 602 and the first right corner 610B of cell 604 of the Voronoi diagram from sector azimuth 612.

Figure 7:
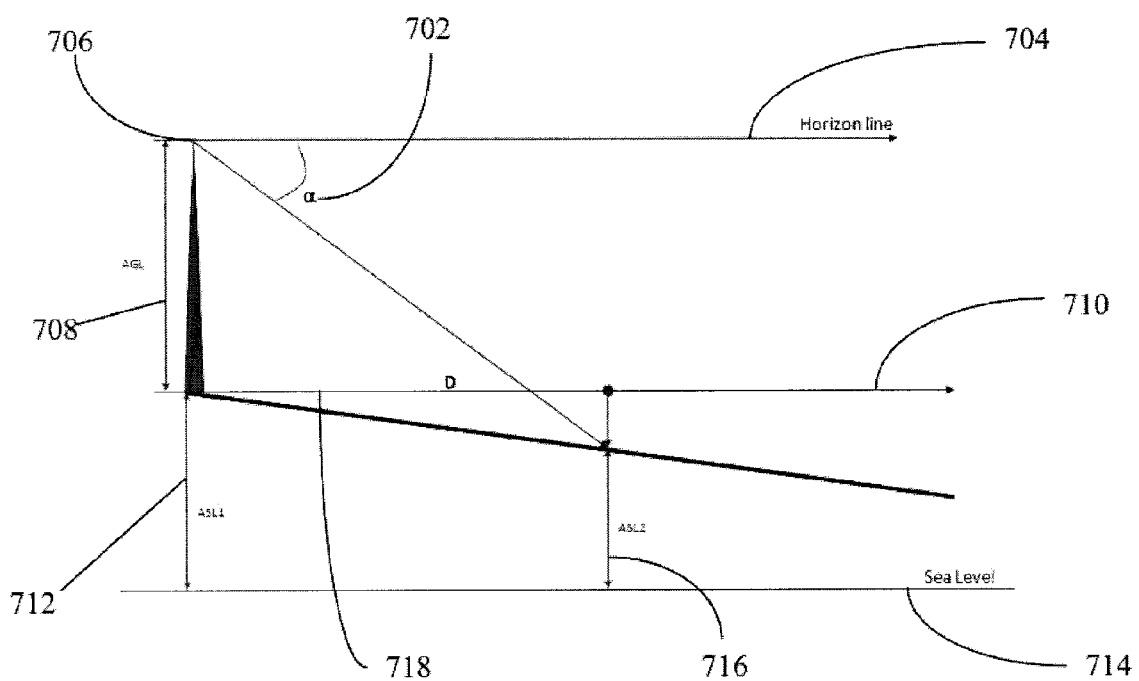

Reference is now made to FIG. 7, which is a schematic diagram to help calculate an initial electrical tilt angle 702 of an antenna 706, in accordance with some embodiments of the presently disclosed subject matter. Optionally, initial tilt angle 702 is used to calculate the coverage cost and/or interference cost, for example, as described below. Optionally, initial tilt angle 702 is iteratively adjusted to try and achieve the selected coverage and/or interference, for example, as described with reference to the method of FIG. 1.

Optionally, electrical tilt angle 702 is in reference to horizontal line 704.

Optionally, the initial electrical tilt angle is calculated for each antenna in a sector of a cluster. Optionally, the initial electrical tilt angle is calculated for all affected antennas having overlapping coverage.

Optionally, the initial electrical tilt angle is calculated by obtaining data from a Terrain Height Profile (THP), which considers changes in elevation at the surface of the earth.

The changes in elevation may be estimated, for example, from a database of measured values, such as the Digital Terrain Map (DTM). DTM is a common data source for mobile operators around the world. DTM contains terrain tile bins (50×50 meters or less), where each bin contains surface height Above Sea Level (ASL).

Optionally, the THP is retrieved for each combination of latitude, longitude and/or Azimuth, for each deployed antenna.

Optionally, a database of point sets is generated using the THP for each antenna. For example, the 0 distance corresponds to the latitude and/or longitude antenna location, the azimuth (e.g., in degrees) is related to the antenna properties, the maximal sampling distance from the antenna location is about 10000 meters, and/or the distance between sampling points along the maximal sampling distance path is about 50 meters. A single THP may contain, for example, about 200 ASL points at 50 meter steps.

Figure 8:
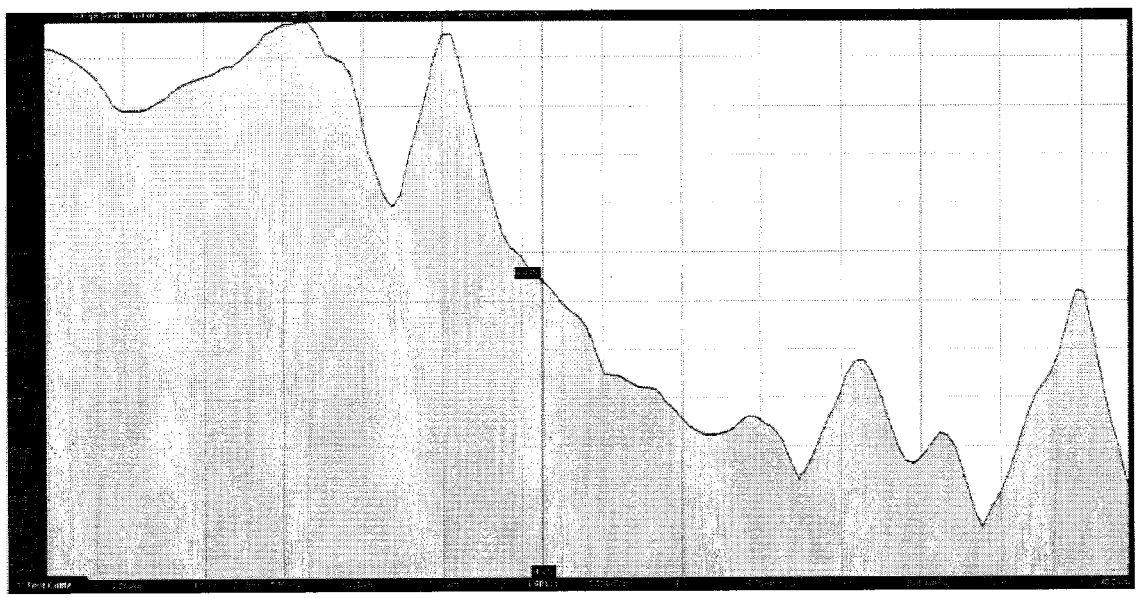

Reference is now made to FIG. 8, which is an exemplary schematic representing THP data retrieved from Google Earth, in accordance with some embodiments of the presently disclosed subject matter.

Referring back to FIG. 7, initial tilt angle 702 α is calculated using the equation:

$$\alpha = \tan^{-1}\left[\frac{(H + ASL_1 - ASL_2)}{D} + 90\right] - 90$$

Where:

H 708 denotes a sector height Above Ground Level (AGL) 710.

$ASL_1$ 712 denotes an antenna location height Above Sea Level (ASL) 714.

$ASL_2$ 716 denotes a target distance D point height Above Sea Level (ASL) 714.

D 718 denotes a target distance (e.g., meters), for example, as calculated with reference to FIGS. 6A-6B.

$ASL_2$ for D point may be calculated as an approximation between the two closest points from the THP dataset for the antenna.

Optionally, the calculations are in degrees.

Optionally, $H + ASL_1 \geq ASL_2$.

Referring back to FIG. 1, at 104, a coverage cost parameter is calculated for the antenna. Optionally, the coverage cost parameter is associated with the gain of the antenna in relation to the coverage area. Optionally, the antenna has the initial electrical tilt of block 102, or an adjusted electrical tilt as will be described below.

Optionally, relatively increased antenna gain over the coverage area is associated with relatively lower coverage cost. Alternatively, relatively increased antenna gain over the coverage area is associated with relatively higher coverage cost.

Optionally, the coverage cost parameter is calculated over the range of the coverage area, for example, by in incremental increases of the azimuth angle, for example, in steps of about 1 degree, or about 0.5 degree, or other values.

Optionally, the antenna gain is calculated or obtained from, for example, a table of values, a mathematical equation, a vertical cellular antenna radiation pattern, or other methods.

Figure 4:
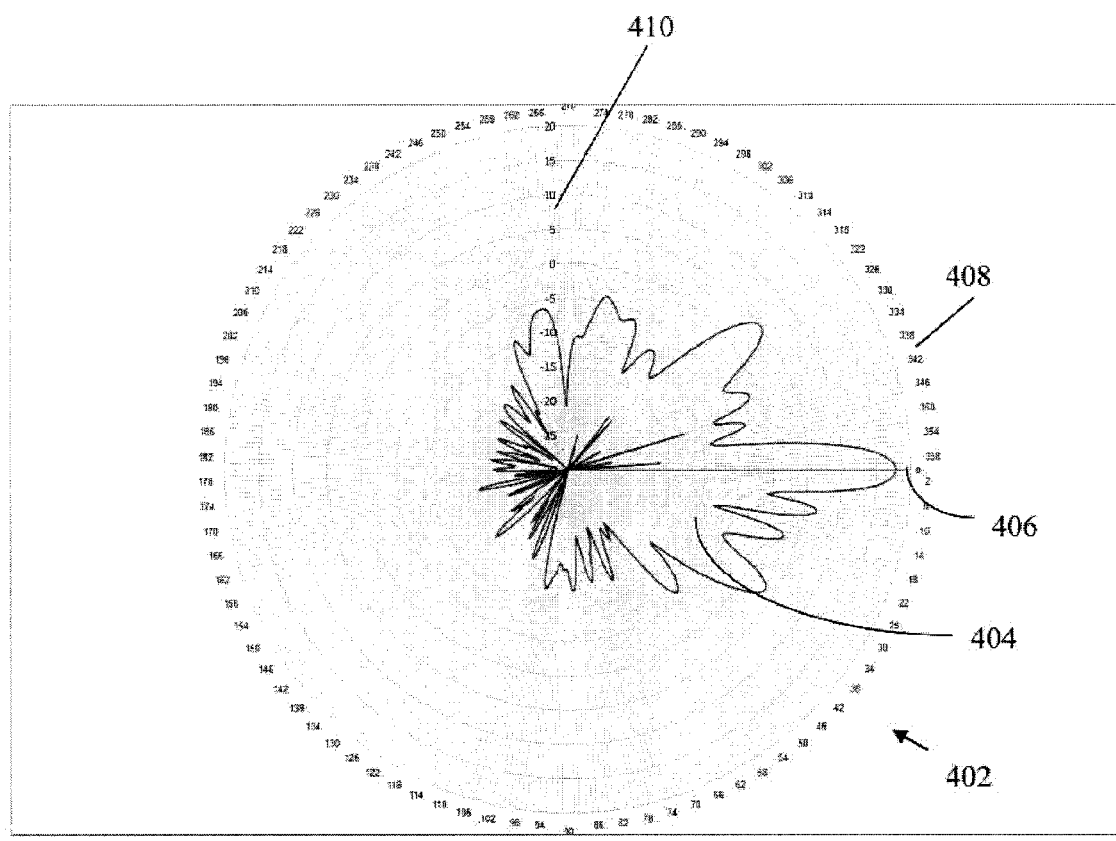

Reference is now made to FIG. 4, which is an exemplary schematic of a vertical cellular antenna radiation pattern 402 for an exemplary antenna (e.g., sector antenna) having a specified electrical tilt angle, in accordance with some embodiments of the presently disclosed subject matter. Optionally, the radiation pattern is used to calculate or estimate antenna gain at different locations corresponding to different angles relative to a horizontal line 406, for example, as will be discussed below. The antenna vertical radiation pattern may be selected for specific applications and/or target requirements.

As shown, pattern 402 is associated with the electrical angle tilt of zero (0) degrees.

Pattern 402 has a main lobe 404 having a relatively high gain at the electrical tilt angle of zero degree (along angle scale 408), measuring about 18 decibels (dB) (along decibel scale 410). Pattern 402 also has smaller side lobes with local gain peaks, and dips representing local minimum values between the side lobes.

Figure 5:
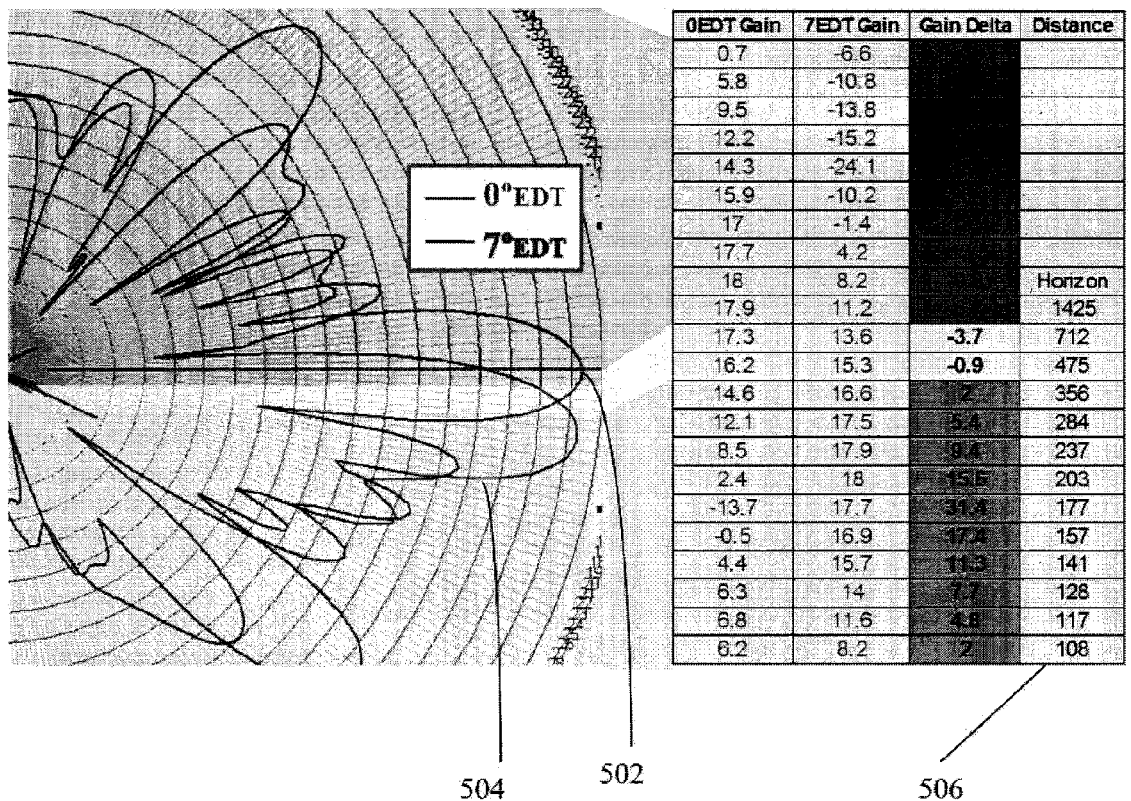

Reference is now made to FIG. 5, which is a schematic showing the vertical radiation pattern of FIG. 4 at a zero degree electrical tilt 502 and at a seven degree electrical tilt 504, in accordance with some embodiments of the presently disclosed subject matter.

FIG. 5 also shows a table 506 of gain values for zero degree tilt pattern 502 and seven degree tilt pattern 504, correlated with the distance to the target along the ground. The distances are calculated for increments of one degree relative to the horizon (i.e. 0 degrees). The correlation between distance and angle has been discussed in more detail, for example, with reference to table 302 of FIG. 3.

Table 506 has a column of the difference in gain between zero degree tilt pattern 502 and seven degree tilt 504 for different distances (which correlate with different angles relative to the horizontal line).

Patterns 502 and 504 and/or table 506 may help in selecting the electrical tilt angle for the antenna. For example, for the target distance of 356 meters, pattern 504 with the seven degree tilt provides relatively higher gain (16.6 dB) relative to pattern 502 with zero tilt (14.6 dB).

Figure 9:
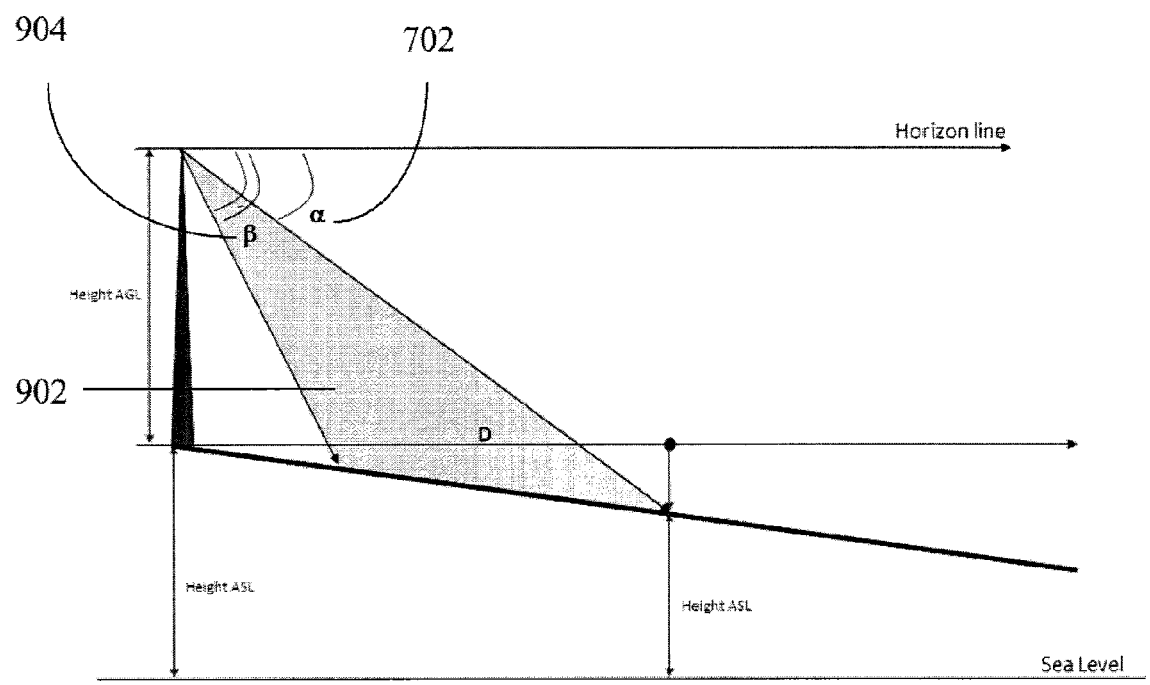

Reference is now made to FIG. 9, which is the schematic diagram of FIG. 7, with a coverage area 902 and associated end angle β 904, in accordance with some embodiments of the presently disclosed subject matter. FIG. 9 may be helpful in calculating a coverage cost function.

Optionally, β 904=α 702+10°. Alternatively, other values than 10 may be used, for example, 5, 7, 12, or other smaller, intermediate, or larger values.

Optionally, the coverage cost function is calculated using the equation:

$$Cost_{Coverage} = \sum_{n=1}^{10}\left(G_{\alpha+n-1} \times \frac{1}{n}\right)$$

Where:

$G_\alpha$ denotes the antenna vertical radiation pattern gain for the antenna with the initial angle α 702, for example, as described with reference to FIG. 5.

The sum of antenna gain values is calculated for start angle α 702 and end angle β 704, for the antenna with tilt angle α 702, for example, as described with reference to FIG. 5. For example, for the antenna with zero tilt, the gain from 0-10 degrees may be read from the table: 18+17.9+17.3+ . . . . For example, for the antenna with seven degrees of tilt, the gain from 7-17 degrees may be read from the table: 18+17.7+16.9+15.7+ . . . .

The n step denotes, for example, 1 degree. Other steps may be used, for example, 2 degrees, 3 degrees, or other numbers such as fractions of a degree, or larger numbers.

Referring now back to FIG. 1, optionally at 106, an interference cost parameter is calculated for the antenna. Optionally, the interference cost parameter is associated with the gain of the antenna for the interference area.

Optionally, relatively increased antenna gain over the interference area is associated with relatively higher interference cost. Alternatively, relatively increased antenna gain over the interference area is associated with relatively reduced interference cost.

Optionally, the interference cost parameter is calculated over the range of the interference area, for example, by incremental increases of the azimuth angle, for example, in steps of about 1 degree, or about 0.5 degree, or other values.

Figure 10:
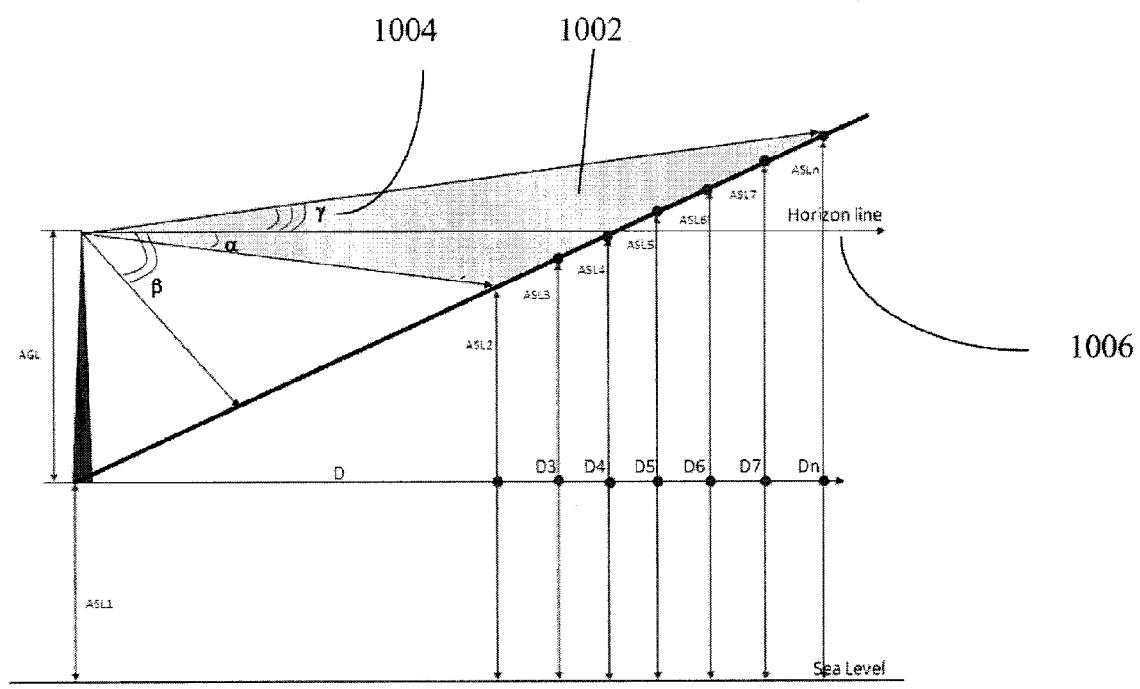

Reference is now made to FIG. 10, which is the schematic diagram of FIG. 9, with an interference area 1002 and associated end angle γ 1004, in accordance with some embodiments of the presently disclosed subject matter. FIG. 10 may be helpful in calculating an interference cost function.

Optionally, the interference cost function is calculated using the equation:

$$Cost_{Interference} = \sum_{n=\alpha}^{\gamma} G_n$$

Where:

$$\gamma = \min_n \left\{ \tan^{-1}\left[\frac{(H + ASL_2\_ASL_n)}{D_n}\right] + 90 \right\} - 90$$

$G_n$ denotes the antenna vertical radiation pattern gain on angle n, for the antenna with initial angle α, for example, as described with reference to FIG. 5.

Angle γ 1004 has positive values below horizontal line 704 and negative values above horizontal line 1006.

$ASL_n$ starts from $ASL_2$ value for D point and sampled for example, every 100 meters, till the end of the THP distance (e.g., 10000 meters).

Referring now back to FIG. 1, at 108, at least one parameter indicative of client resource use is received for the antenna. Optionally, the parameter indicative of client resource use is received for each antenna in the cluster and/or in the network.

Optionally, the parameter indicative of client resource use is a parameter associated with interference, for example, interference between different clients as discussed hereinabove. Optionally, the parameter associated with network interference is related to the RTWP, for example, the mean RTWP, the RTWP for a specified percentile (e.g., $90^{th}$ percentile), the RTWP spread between neighboring antennas, the RTWP distribution over a predefined time period, or other parameters. Alternatively or additionally, other suitable parameters associated with client resource use and/or interference may be used.

At 110, a target cost range is selected according to the parameter of client resource use (received in block 108). Optionally, target ranges are selected for each antenna.

The target cost range is selected and/or adjusted according to dynamics of the level of the parameter of client resource use. For example, the lower limit of the target cost range is relatively reduced with relatively higher levels of client resource use. For example, the lower limit of the target cost range is relatively increased with relatively lower levels of client resource use. For example, the target cost range is maintained with substantially unchanging levels of client resource use.

The selection may be performed automatically by software (e.g., using an equation, a look-up table, or a decision tree) and/or manually by the operator.

At 112, the calculated coverage cost (block 104) is correlated with the target cost range (block 110) to determine when the calculated coverage cost falls within the target cost range.

Optionally, the corresponding calculated interference cost (block 106) is correlated with the target cost range and/or with the calculated coverage cost, to determine if the interference cost is at a local minimum level within the target cost range.

Optionally, at 114, the electrical tilt angle is adjusted. Optionally, the electrical tilt angle is incrementally adjusted up and/or down, for example, in steps of about 1 degree, about 0.5 degree, about 2 degrees, or other smaller, intermediate or larger degrees. Alternatively, the electrical tilt angle is maintained. Alternatively, the electrical tilt angle is adjusted to a pre-determined value, for example, using a database storing indications between tilt angles and client resource use parameter values, coverage costs, interference costs and/or target cost ranges.

Optionally, the electrical tilt angle is adjusted according to the correlation outcome of block 112.

Optionally, relatively higher interference levels are translated into a reduction in the size of the coverage area. The electrical tilt angle of the antenna is relatively increased, so that the azimuth of the antenna point closer to the base of the antenna along the ground. Optionally, relatively lower interference levels are translated into an increase in the size of the coverage area. The electrical tilt angle of the antenna is relatively reduced, so that the azimuth of the antenna points further away from the base of the antenna.

There may be several tilt angles having calculated coverage costs falling within the target cost range. Each tilt angle may be associated with a different interference cost. Optionally, the tilt angle is adjusted to correspond to the lowest interference cost (while maintaining the corresponding coverage cost within the target range).

Optionally, the tilt adjustment is performed in two phases. Optionally, the first gross phase consists of adjusting the tilt angle so that the coverage cost falls within the target range. Optionally, the second fine phase consists of adjusting the tilt angle so that the interference cost is at a local minimum.

Alternatively, the tilt angle is not adjusted, if the selected tilt angle falls within predefined criteria: the calculated coverage cost for the selected tilt angle of the antenna falls within the target cost range and optionally the corresponding calculated interference cost is at a local minimum.

Optionally, at 116, the parameter indicative of client resource use (block 108) is monitored.

The parameter of client resource use may be updated, for example, every about 1 second, about 10 seconds, about 1 minute, about 30 minutes, about 1 hour, about 2 hours, about 6 hours, about 12 hours, or other smaller, intermediate or larger time frames.

Optionally, the parameter is correlated with a predefined range. Optionally, the value of the parameter outside of the predefined range triggers an adjustment of the electrical tilt angle. Optionally, the electrical tilt angle is adjusted until the parameter of client resource use falls back to within the predefined range.

Optionally, the predefined range is a threshold for a distribution spread over a selected period of time. For example, the predefined range is an upper limit on the amount of interference allowed during the period of time.

Optionally, at 118, the arrangement of the antennas in the cluster is modified. Optionally, a new antenna is added to the cluster. Alternatively or additionally, an existing antenna is removed from the cluster.

Optionally, the addition of the new antenna triggers adjustment of the tilt angle for the new antenna.

Optionally, the modification of the antenna cluster configuration triggers adjustment of the tilt angles for each of the affected antennas.

Optionally, antennas may be taken down for maintenance, with remaining antennas automatically adjusting tilt angles to compensate for the removed antenna. Optionally, new antennas and/or nearby affected antennas may be easily configured.

At 120, one or more blocks in the process are repeated. Optionally, the iteration selects tilt angles for one or more antennas, the tilt angles may provide for the best relative coverage with the lowest relative interference.

Optionally, the process is repeated for each antenna in the cluster. Optionally, the process is repeated for all the antennas. Alternatively, the process is repeated for antennas affected by changes to nearby antennas. Reducing coverage for one antenna may increase interference for neighboring antennas, as the neighboring antennas may need to allocate additional resources to clients due to reduce reduction to those clients by the tilted antenna. Alternatively, the process is repeated for each antenna as needed. In this manner the system may self adjust tilt angles for antennas as defined, for example, by feedback from the measured network performance parameter for each of the antennas.

Optionally, the process is repeated for each antenna independently of the other antennas. For example, the calculations are performed in parallel. Optionally, the parallel and/or independent processing, may allow relatively short calculation times. For example, a set of linear equations may be set up and solved. Optionally, tilt angles may respond quickly to changing conditions and/or resource use.

Reference is now made to FIG. 11, which is an exemplary system 1100 for automatically selecting an electrical antenna tilt according to one or more parameters indicative of user resource use, in accordance with exemplary embodiments of the presently disclosed subject matter. Optionally, system 1100 executes the computerized method described with reference to FIG. 1.

Optionally, system 1100 may allow adjustment of the tilt angles to be performed independently for each antenna. The electrical tilt angle of the antenna may be performed locally and/or remotely from a central site. Optionally, part of system 1100 is located remotely, for example, at the antenna tower, connected to the radio access network, which may allow a field technician to locally operate the software. Alternatively or additionally, part of system 1100 is centrally located, for example, in a network control building, connected to the core network, which may allow a network technician to centrally operate the software.

Multiple antennas 1102A-C are arranged to provide wireless coverage as part of a cellular network. Optionally, antennas 1102A-C are sector antennas. Optionally, antennas 1102A-C are arranged in at least one cluster, optionally with overlapping coverage to allow for client hand-offs.

Optionally, the cellular network is a Universal Mobile Telecommunication System (UMTS) network. Alternatively or additionally, the cellular network is a Long Term Evolution (LTE) network. Alternatively or additionally, the antennas may be part of other types of cellular networks.

One or more processors 1104 are in electrical communication with antennas 1102A-C, for example, residing in the radio access network. Processor 1104 is programmed to process received data from antennas 1102A-C to calculate one or more parameters indicative of client resource use per antenna 1102A-C.

An optional second processor 1106 is in electrical communication with processor 1104, for example, by a network linking a central office with the radio access network. Processor 1106 may be a tilt angle calculation unit programmed to carry out the steps of the method of FIGS. 1A and/or 1B.

Optionally, one or more remote actuators 1108 are in electrical and/or mechanical communication with antennas 1102A-C, for example, residing within the same physical structure supporting antennas 1102A-C. Actuator 1108 is in electrical communication with processor 1106. Processor 1106 remotely controls actuator 1108 to remotely adjust the electrical tilt angle of antennas 1102A-C.

Optionally, processor 1104 is in electrical communication with a non-transient memory 1110 storing program instruction for execution by processor 1104. Optionally, the program instructions comprise a self optimizing network (SON), a program for automatically optimizing the performance of the cellular network.

Optionally, processor 1106 is in electrical communication with a non-transient memory 1112 storing one or more modules 1114A-C for instruction execution by the hardware processor, for example:

a module for automatically determining a target coverage cost range for the at least one antenna according to the at least one parameter indicative of client resource use;

a module for automatically calculating a coverage cost for the at least one antenna using an initial electrical tilt angle;

a module for automatically calculating a corresponding interference cost of the at least one antenna using the initial electrical tilt angle;

a module for automatically selecting an electrical tilt angle for the at least one antenna, by iteratively changing the initial tilt angle, so that the calculated coverage cost for the selected tilt angle is within the target coverage cost range, and so that the corresponding calculated interference cost for the selected electrical tilt angle is at a minimum within the target coverage cost range; and/or a module for remotely changing the existing electrical tilt angle of the at least one antenna according to the selected electrical tilt angle.

Optionally, modules 1114A-C are programmed for integration with the SON program.

Optionally, a display screen 1116 in electrical communication with processor 1106 displays text, images and/or other data.

Optionally, an input unit 1118 in electrical communication with processor 1106 allows the operator to control processor 1106 and/or related devices such as the actuator 1108.

Reference is now made to FIG. 12, which is a flowchart of an exemplary method of implementing the method of FIG. 1 and/or for execution by the system of FIG. 11, in accordance with some embodiments of the presently disclosed subject matter.

Antenna deployment patterns 1202 (e.g., current electrical tilt angle) are provided to calculate cost functions 1204 (e.g., coverage, interference), for example, as described with reference to block 104 of FIG. 1. The cost functions may be calculated for each antenna.

Sector performance data 1206 is analyzed to provide antenna performance data 1208 indicative of client resource use, for example, as described with reference to block 108 of FIG. 1. For example, rtwpMean (mean RTWP values), rtwpPercentile (RTWP value corresponding to a certain percentile), incomingNeighborsNumber (identification number to access affected neighboring antennas).

Parameters 1210 specify control variables in the adjustment of the electrical tilt angle. Parameters 1210 may be preset by the manufacturer, manually adjustable by the operator and/or automatically adjustable by software. For example, maxUpTiltStep (incremental number of degrees per angle increase), maxDownTiltStep (incremental number of degrees per angle decrease), referenceRtwpLow (lowest acceptable level of RTWP), referenceRtwpHi (highest acceptable level of RTWP), deltaRtwpRefThreshold, deltaRtwpThreshold1, deltaRtwpThreshold2 (highest acceptable change thresholds in magnitude of RTWP), coverageFactor1, coverageFactor2, coverageFactor3, coverageFactor4 (lower limits of the target cost range).

At 1212, the bestTilt is determined by calling the function findBestTiltbyCoverage( ). The bestCoverage is determined by calling the function findBestCoverage( ). The tilt and/or corresponding coverage are determined, for example, as described with reference to FIG. 1.

At 1214A, the effect of the current tilt is analyzed. If the current tilt angle is lower than previous tilt angles (i.e., higher coverage range; currentTilt<bestTilt), then the current target coverage range is maintained. If the current tilt angle is higher (i.e., worse coverage), then the degree of interference (e.g., RTWP) is analyzed to determine the corresponding new target coverage range. The spread of interference is measured: deltaRTWP=|rtwpPercentile−rtwpMean|. At 1214B, the extent of the spread of interference is compared to threshold values to select the new coverage target range accordingly: deltaRtwp<=deltaRtwpThreshold1, deltaRtwpThreshold1<deltaRtwp<deltaRtwpThreshold2, or other values. If the extent of the spread of noise is relatively low (i.e., deltaRtwp<=deltaRtwpThreshold1), then at 1214C another decision is made to select the new coverage target accordingly. An acceptable interference level is obtained (rtwpRef=findRtwpRef( ). If the spread of interference is within acceptable limits (|rtwpMean−rtwpRef|<deltaRtwpRefThreshold|, then the current coverage is maintained. Otherwise, a new coverage target range is selected.

For 1214A-1214C, the new coverage is selected by coverageFactors1-4.

At 1216, the new target coverage range is selected: requiredCoverage=bestCoverage*coverageFactor.

At 1218, the tilt with the lowest interference cost within the target coverage range is determined. For example, requiredTilt=findRequiredTiltByCoverage finds the lowest interference cost that is placed between bestCoverage and requiredCoverage values).

Optionally, at 1220, the current tilt angle is iteratively adjusted up or down to find the best tilt angle. For example, decisionTilt=calculateDecisionTilt( ) calculates the tilt according to one or more parameters 1210: maxUpTiltStep, maxDownTiltStep, and/or maxFineTuneDownTiltStep.

It is expected that during the life of a patent maturing from this application many relevant cellular network antennas will be developed and the scope of the term antenna is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this presently disclosed subject matter may be presented in a range format. It should be understood that the description in range format is merely for convenience and brevity and should not be construed as an inflexible limitation on the scope of the presently disclosed subject matter. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination or as suitable in any other described embodiment of the presently disclosed subject matter. Certain features described in the context of various embodiments are not to be considered essential features of those embodiments, unless the embodiment is inoperative without those elements.

Although the presently disclosed subject matter has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the presently disclosed subject matter. To the extent that section headings are used, they should not be construed as necessarily limiting.

The invention claimed is:

1. A computer-implemented method of selecting an electrical tilt angle for at least one antenna, the method being carried out by a tilt angle calculation unit programmed to carry out the steps of the method, which comprise: receiving at least one parameter indicative of mobile client resource use associated with at least one cellular antenna, the at least one cellular antenna being part of a plurality of antennas arranged in at least one cluster as part of a cellular network; selecting a target coverage parameter for the at least one antenna according to the at least one parameter indicative of client resource use; calculating a coverage cost for the at least one antenna using an initial electrical tilt angle; iteratively adjusting an electrical tilt angle of the at least one antenna so that the at least one parameter indicative of client resource use is maintained within at least one predefined threshold, thereby providing users of the mobile clients of the at least one cellular antenna with at least a level of service within the at least one predefined threshold and wherein iteratively adjusting further comprises iteratively adjusting the electrical tilt angle according to the calculated coverage cost for the selected tilt angle relative to the target coverage cost parameter.

2. The computerized method of claim 1, wherein the at least one parameter indicative of client resource use comprises at least one parameter indicative of interference.

3. The computerized method of claim 2, wherein the at least one parameter indicative of interference comprises at least one parameter associated with measured Received Total Wideband Power (RTWP).

4. The computerized method of claim 3, wherein the at least one predefined threshold comprises an upper limit for the mean value of the RTWP during a predefined time period.

5. The computerized method of claim 1, wherein the lower limit of the target coverage cost range is reduced with increased client resource use.

6. The computerized method of claim 1, further comprising monitoring the at least one parameter indicative of client resource use, and re-selecting the electrical tilt angle when the at least one parameter indicative of client resource use is outside of the at least one predefined threshold.

7. The computerized method of claim 6, wherein the predefined range comprises thresholds for a distribution spread over time of the at least one parameter indicative of client resource use.

8. The computerized method of claim 1, further comprising: calculating a corresponding interference cost of the at least one antenna using the electrical tilt angle; and wherein iteratively adjusting further comprises iteratively adjusting the electrical tilt angle according to the corresponding calculated interference cost relative to the target coverage cost parameter.

9. The computerized method of claim 8, wherein the coverage cost and the interference cost are both calculated using vertical radiation patterns of the at least one antenna.

10. The computerized method of claim 1, wherein the coverage cost comprises a coverage cost function calculated as:

$$Cost_{Coverage} = \sum_{n=1}^{10} \left( G_{\alpha+n-1} \times \frac{1}{n} \right);$$

wherein $G_\alpha$ is the antenna vertical radiation pattern gain for the antenna with electrical angle $\alpha$.

11. The computerized method of claim 8, wherein the interference cost comprises an interference cost function calculated as:

$$Cost_{Interference} = \sum_{n=\alpha}^{\gamma} G_n;$$

wherein $$\gamma = \min_n \left\{ \tan^{-1}\left[ \frac{(H + ASL_2 - ASL_n)}{D_n} \right] + 90 \right\} - 90;$$

and $G_n$ is the antenna vertical radiation pattern gain on angle n, for the antenna with initial angle $\alpha$.

12. The computerized method of claim 8, further comprising calculating the coverage cost and corresponding interference cost in view of the client resource use parameter, for each of the affected antennas within the cluster, so that the electrical tilt angles in the affected antennas are adjusted in response to changes in the tilt angle of the one or more antennas.

13. The computerized method of claim 1, wherein the electrical tilt angle is calculated according to physical deployment parameters of the at least one antenna, and considering the distance from the antenna to the outer edge of a coverage zone of the antenna along the surface of the earth.

14. The computerized method of claim 1, wherein an initial setting of the electrical tilt angle is a pre-existing electrical tilt angle setting of the at least one antenna.

15. The computerized method of claim 1, further comprising adding a new antenna to the at least one cluster, and automatically selecting the electrical tilt angle for the new antenna according to the client resource use parameter.

16. The computerized method of claim 1, further comprising removing an existing antenna from the at least one cluster, and automatically selecting new electrical tilt angles for the remaining affected antennas in the cluster, according to the client resource use parameter.

17. A system for automatic cellular antenna electrical tilt adjustment comprising: at least one cellular antenna arranged in at least one cluster as part of a cellular network; a computer in electrical communication with the at least one antenna, the computer programmed to receive signals from the at least one antenna and calculate at least one parameter indicative of mobile client resource use associated with the at least one cellular antenna; a hardware processor in electrical communication with the computer and with the at least one antenna; a non-transitory memory having stored thereon program modules for instruction execution by the hardware processor, comprising: a module for selecting a target coverage parameter for the at least one antenna according to the at least one parameter indicative of client resource use; calculating a coverage cost for the at least one antenna using an initial electrical tilt angle; iteratively adjusting an electrical tilt angle of the at least one cellular antenna so that the at least one parameter indicative of mobile client resource use is maintained within at least one predefined threshold, thereby providing users of the mobile clients of the at least one cellular antenna with at least a level of service within the at least one predefined threshold and wherein iteratively adjusting further comprises iteratively adjusting the electrical tilt angle according to the calculated coverage cost for the selected tilt angle relative to the target coverage cost parameter.

18. The system of claim 17, wherein the at least one antenna is coupled to an actuator with remote control capabilities, and the memory further comprises a module for remotely changing the existing electrical tilt angle of the at least one antenna according to the iteratively adjusted electrical tilt angle.

19. The system of claim 17, wherein the at least one antenna is a sector antenna.

20. The system of claim 17, wherein the cellular network comprises a Universal Mobile Telecommunications System (UMTS) network or a Long Term Evolution (LTE) network.

21. The system of claim 17, further comprising a computer system programmed to execute program instructions of a self optimizing network (SON) for the cellular network, and wherein the modules are programmed for integration with the SON program.

22. A computer program product for automatically selecting an electrical antenna tilt angle, the computer program product comprising:

one or more non-transitory computer-readable storage mediums, and program instructions stored on at least one of the one or more storage mediums, the program instructions comprising:

program instructions for automatically receiving at least one parameter indicative of client resource use for at least one antenna of a plurality of antennas arranged in at least one cluster as part of a cellular network;

program instructions for automatically selecting a target coverage cost range for the at least one antenna according to the at least one parameter indicative of client resource use;

program instructions for automatically calculating a coverage cost for the at least one antenna using an initial electrical tilt angle;

program instructions for automatically calculating a corresponding interference cost of the at least one antenna using the initial electrical tilt angle;

program instructions for automatically selecting an electrical tilt angle for the at least one antenna, by iteratively changing the initial tilt angle, so that the calculated coverage cost for the selected tilt angle is within the target coverage cost range, and so that the corresponding calculated interference cost for the selected electrical tilt angle is at a minimum within the target coverage cost range; and program instructions for automatically changing the existing electrical tilt angle of the at least one antenna according to the selected electrical tilt angle.

\* \* \* \* \*